United States Patent [19]

Gless, Jr. et al.

[11] E Re. 30,362

[45] Reissued Aug. 5, 1980

[54] PROCESS FOR PREPARING POLYVINYLAMINE AND SALTS THEREOF

[75] Inventors: Richard D. Gless, Jr., Oakland; Daniel J. Dawson, Los Altos; Robert E. Wingard, Jr., Palo Alto, all of Calif.

[73] Assignee: Dynapol, Palo Alto, Calif.

[21] Appl. No.: 30,781

[22] Filed: Apr. 17, 1979

Related U.S. Patent Documents

Reissue of:

[64] Patent No.: 4,018,826
Issued: Apr. 19, 1977
Appl. No.: 520,530
Filed: Nov. 4, 1974

[51] Int. Cl.[2] ..... A23L 1/27; C07C 87/24; C08F 120/52; C08F 126/02

[52] U.S. Cl. ..... 525/355; 8/647; 260/144; 260/159; 260/543 A; 260/556 B; 260/561 R; 260/561 N; 426/250; 526/75; 526/303; 525/336; 525/369; 525/351; 525/377; 260/583 P; 525/353; 525/375

[58] Field of Search ..... 260/583 R, 583 P, 583 N; 526/12, 47, 310

[56] References Cited

U.S. PATENT DOCUMENTS

| | | | |
|---|---|---|---|
| 2,318,730 | 5/1943 | Wilson | 260/583 P |
| 2,365,340 | 12/1944 | Hanford et al. | 260/89.7 N |
| 2,632,757 | 5/1953 | Reynolds et al. | 260/89.7 N X |
| 2,839,516 | 6/1958 | Weisgerber | 260/89.7 N X |
| 3,221,055 | 11/1965 | Robins | 260/583 P |
| 3,242,138 | 3/1966 | Van Paesschen | 260/65 |
| 3,401,156 | 9/1968 | Lovett et al. | 260/89.7 N |
| 3,454,555 | 7/1969 | Van der Voort et al. | 260/583 P X |
| 3,519,687 | 1/1973 | Schneider et al. | 260/583 P X |
| 3,714,259 | 7/1976 | Lichtenwalter et al. | 260/583 P |

OTHER PUBLICATIONS

Ben-Ishai et al., Chemical Abstracts, vol. 64, 12592 (1966).
Blance et al., Chemical Abstracts, vol. 65, 10695 (1966).
Hart, J. Polymer Science, vol. 29, pp. 629 to 636 (1958).
Michio et al., Chemical Abstracts, vol. 72, 22105b (1970).
Noyes et al., J. Am. Chem. Soc., vol. 55, pp. 3493 to 3494 (1933).
Rath et al., Chemical Abstracts, vol. 59, 14131 (1965).
Reynolds et al., J. Amer. Chem. Soc., vol. 69, pp. 911 to 915 (1947).
Richter, Ber. Deut. Chem. Gesell., vol. 5, p. 477 (1872).
Scheibler et al., Ber. Deut. Chem. Gesell., vol. 87, pp. 379 to 383 (1954).

*Primary Examiner*—Floyd D. Higel
*Attorney, Agent, or Firm*—William H. Benz

[57] ABSTRACT

Poly(vinylamine salts of mineral acids are produced by reacting acetaldehyde and acetamide at a mole ratio of 1:2-4 with acid catalyst, cracking the ethylidene-bisacetamide which results into vinylacetamide, polymerizing the vinylacetamide with a free radical polymerization catalyst, and hydrolyzing the poly(-vinylacetamide) to the desired amine salts by contacting the polyvinylacetamide with an aqueous solution of the corresponding mineral acid. This product may be converted to the free amine, which in turn may function as a precursor in the manufacture of certain polymeric dyes and colorants.

6 Claims, 4 Drawing Figures

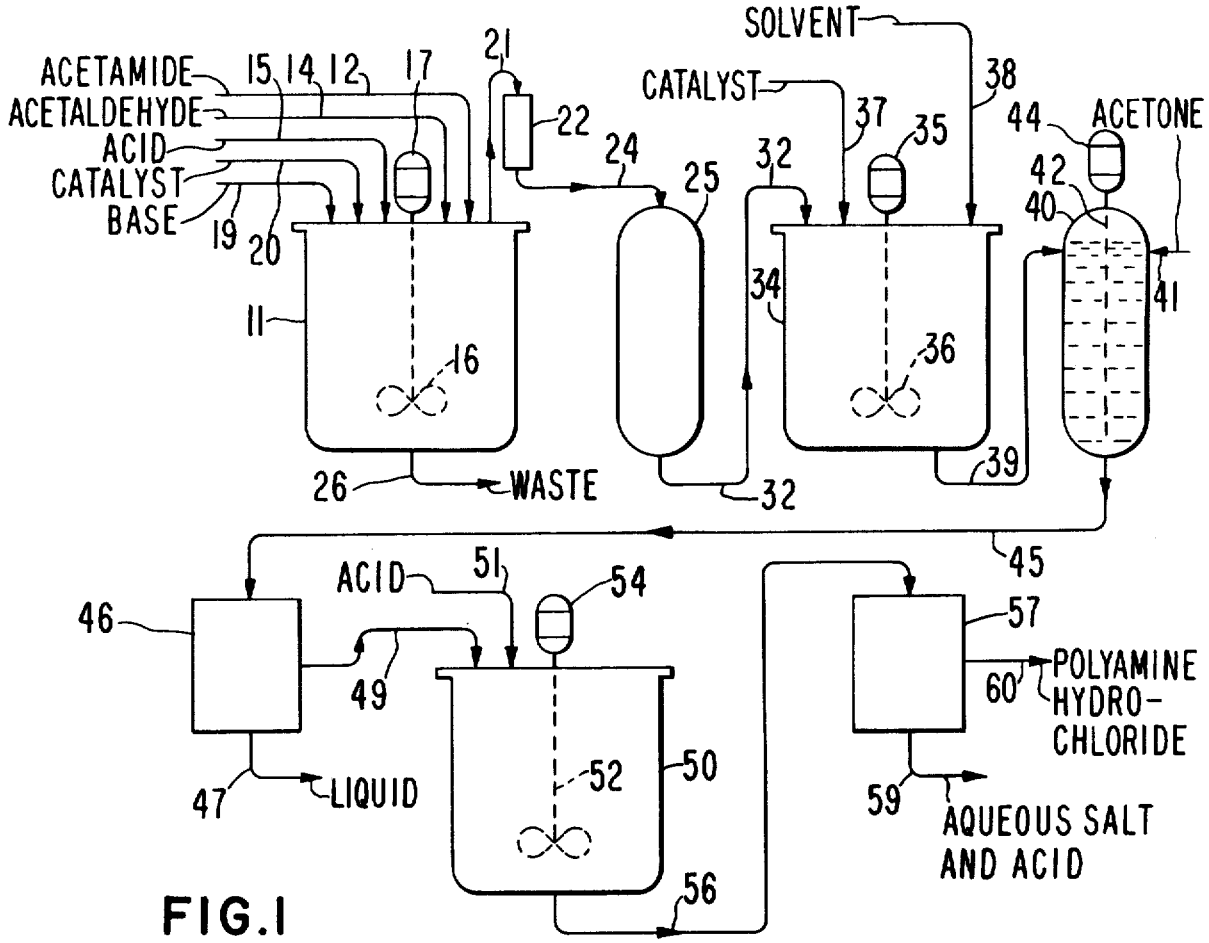
FIG.1
FIG.2
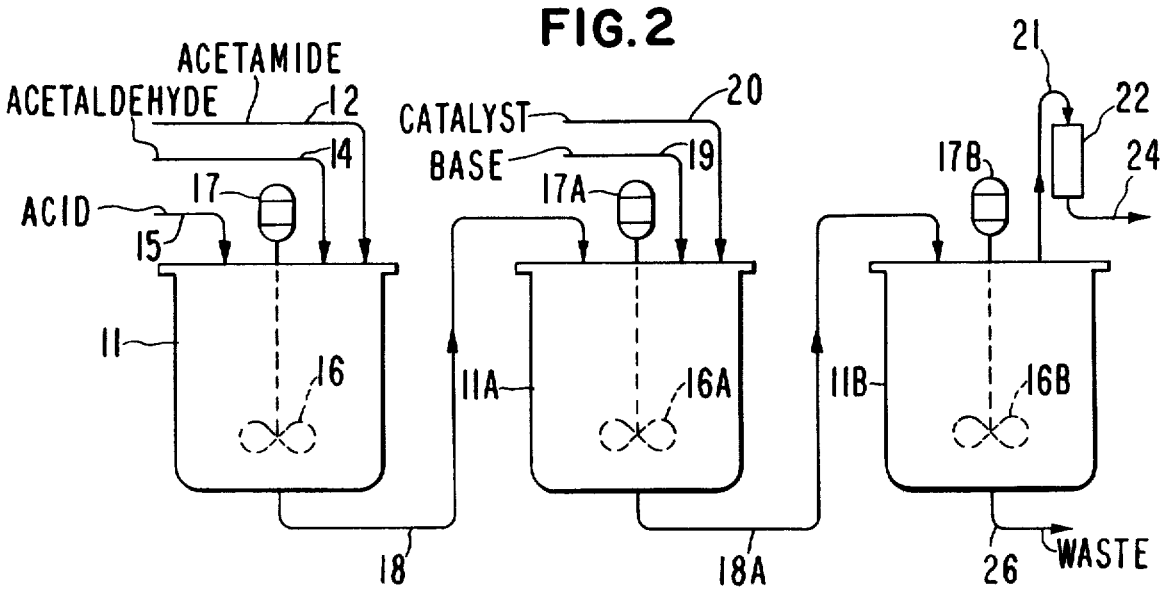

PROCESS FOR PREPARING POLYVINYLAMINE AND SALTS THEREOF

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to a chemical process for forming poly(vinylamine) salts *of mineral acids*, especially poly(vinylamine hydrochloride), and in preferred embodiments relates to further treating said poly(vinylamine) salts to yield poly(vinylamine) and poly(-vinylamine)-based polymeric colorants. The invention also relates to the products of this process.

2. The Prior Art

Poly(vinylamine) salts, such as poly(vinylamine hydrochloride), are desirable chemicals. Their primary use is as precursors of poly(vinylamine). Being more stable than poly(vinylamine), they are more easily shipped and stored with less precautions being needed to prevent degradation. Poly(vinylamine) may be produced from poly(vinylamine) salts by neutralizing with base. Poly(vinylamine) itself is a linear polymer, which, because of its many active amine groups, finds diverse applications, such as a cationic water treatment resin and as a chemical intermediate. Unfortunately, it has not found widespread commercial use. This is very likely because an integrated overall process for its production has not been provided by the art. Accordingly, it is an object of this invention to provide a process for the preparation of this amine and its precursor salts.

STATEMENT OF THE INVENTION

In its broadest aspect, this invention concerns a process for preparing poly(vinylamine) salts. This process has the following steps:

a. reacting acetaldehyde with at least two stoichiometric equivalents of acetamide in the presence of a strong acid catalyst to yield ethylidene-bis-acetamide;

b. decomposing the ethylidene-bis-acetamide in the presence of an inorganic oxide surface catalyst under essentially neutral pH conditions to yield a decomposition product;

c. separating vinylacetamide from this decomposition product;

d. contacting the vinylacetamide with a free radical initiator under polymerization conditions to yield poly(-vinylacetamide);

e. hydrolyzing this poly(vinylacetamide) with a mineral acid to yield a poly(vinylamine) salt; and f. precipitating and recovering the poly(vinylamine) salt.

The poly(vinylamine) salt product is a linear, uniform polymer which has a molecular weight which can be controlled in the range of from about 4,000 to about 1,000,000; which material, both as a new material and as the product of a new process, represents another embodiment of this invention.

In a further aspect, this invention concerns a process for preparing poly(vinylamine). This process involves contacting poly(vinylamine) salt, prepared by the above-described process, in an aqueous medium with a base of sufficient strength and amount to maintain the medium pH at about 10 or greater. The poly(vinylamine) product which results is a linear polymer of molecular weight of from about 3,000 to about 700,000, having repeating amine functionalities, and represents another aspect of this invention.

The amine product can be further treated and, in one preferred aspect of this invention, is converted into a polymeric dye such as by (1) adding to the amine groups of the poly(vinylamine) an aromatic compound having an amine precursor functionality to form an aromatic amine-substituted polymer product, (2) diazotizing the aromatic amine substituents to form diazo groups, and (3) bonding to the diazo groups an optical color coupler.

These poly(vinylamine) backbone dyes represent yet another aspect of this invention.

BRIEF DESCRIPTION OF THE DRAWINGS

In the Detailed Description of the Invention, reference will be made to the drawings which include 4 FIGS., each a schematic flow diagram.

FIG. 1 illustrates a semi-batch embodiment of the invention as it relates to the preparation of poly(vinylamine) salts;

FIG. 2 illustrates a modification of the process of FIG. 1, enabling continuous operation;

DETAILED DESCRIPTION OF THE INVENTION

Figure 4:
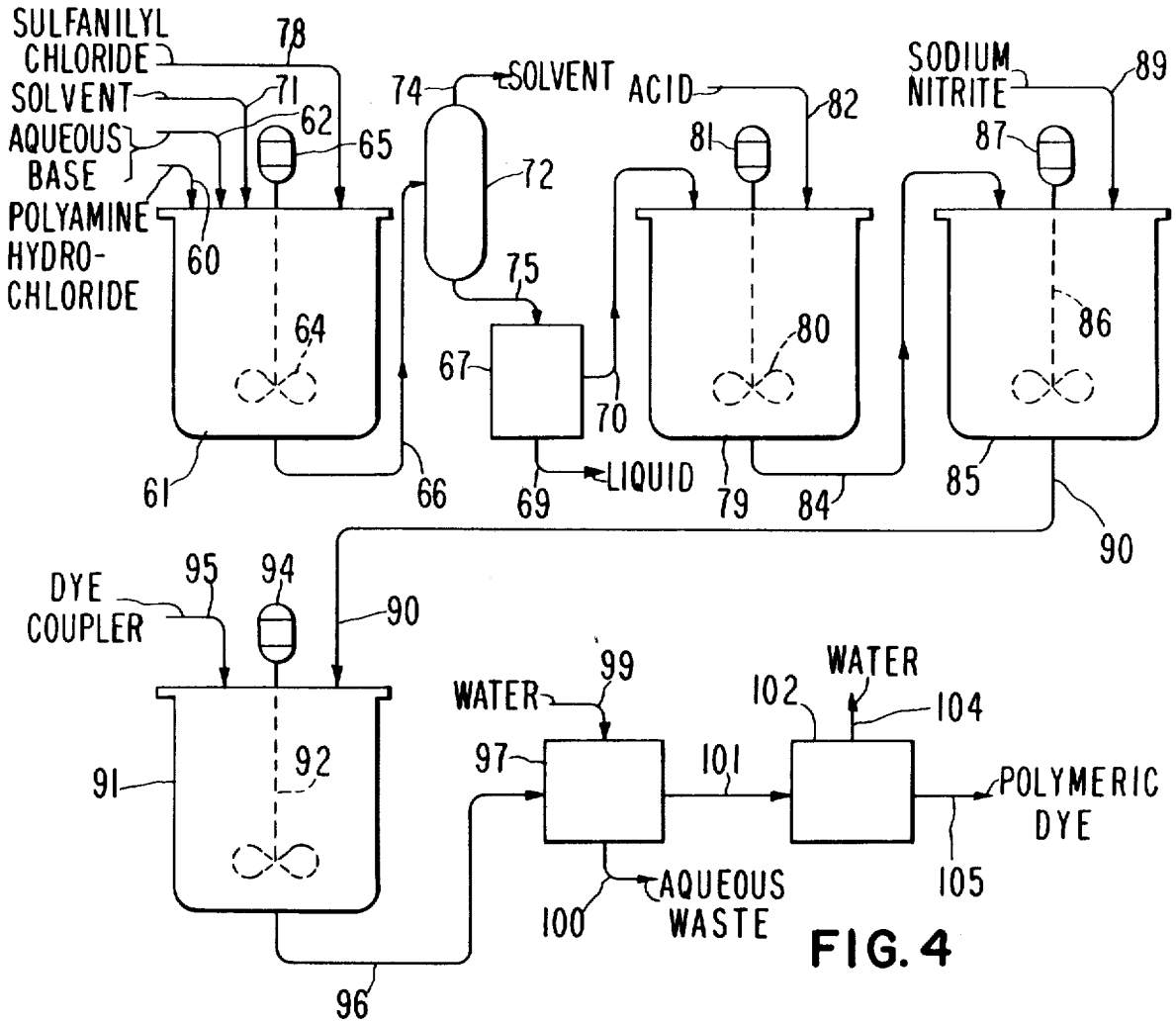
FIG. 4 sets out a process for forming polymeric dyes from the free amine.

In the first step of the process of this invention, one mole of acetaldehyde and two moles of acetamide are reacted to yield ethylidene-bis-acetamide,

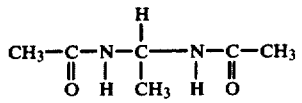

Thus, stiochiometrically, acetaldehyde and acetamide are employed in a ratio of 1:2. Generally, however, it is preferred to use somewhat of an excess of acetamide. Major excesses appear to offer no benefit, so suitably the ratio is controlled between 1:2 and about 1:4. Reaction will occur at ratios outside this range, for example, at ratios of less than 1:2 or greater than 1:4, but such conditions are not preferred. This reaction is carried out with stirring at elevated temperature. Suitable temperatures are in the range of from about 20° C. to about 100° C. Acetaldehyde boils at about 20° C. at atmospheric pressure, so, if temperatures above about 20° C. are desired, suitable superatmospheric pressures must be employed or the reaction temperature must be gradually raised as the acetaldehyde reacts. In a batch mode of operation, the temperature will generally rise from the acetaldehyde reflux temperature (20° C.) to 60°-75° C. as reaction occurs. Thus, preferred reaction temperatures are in the range of about 20° C. to 75° C. This reaction occurs at acidic pHs. Good results are obtained when aqueous mineral acid, such as aqueous sulfuric or hydrochloric acid is added in a catalytically effective amount such as from about 0.001 to 1 mole of acid per mole of acetamide. Preferably, from 0.002 to 0.1 mole of acid is added per mole of acetamide. Larger amounts of acid may be employed, but, since they are neutralized in the next step, offer no advantage.

In the second step, the ethylidene-bis-acetamide product is thermally decomposed (cracked) to vinylacetamide. This cracking can be carried out thermally, such as by heating the ethylidene-bis-acetamide to about 150° C. to 250° C. for from 0.2 to 5 hours, but preferably is carried out catalytically. The use of a catalyst enables the cracking temperature to be lowered into the range of from 70° C. to 200° C. Suitable catalysts include high surface area inorganic solid materials, preferably of a silicous or oxidic nature. As a general rule, nonacidic catalysts give best results. (A nonacidic catalyst is one which by art-known tests such as Hammett indicators gives a nonacidic reading.) Typical useful catalysts include silicious catalysts such as diatomaceous earth, fumed silica, chopped glass fiber, powdered glass, silica gel, and fine sand. Acidic materials to be avoided include silica-alumina hydrocarbon cracking catalysts and the like.

These catalysts should be employed in forms having surface areas of at least about 1 $m^2/g$, preferably with surface areas of from about 10 $m^2/g$ to about 400 $m^2/g$. They may be added to the reaction mixture as powders or pellets or could be employed as a bed through which the reaction mixture is gradually passed. Catalysts which give excellent results and are preferred include diatomaceous earth of surface area 5 $m^2/g$ to 20 $m^2/g$, marketed under the trade name "Celite", and glass wool of surface area 0.1 $m^2/g$ to 1.0 $m^2/g$. Suitable reaction times for the catalytic cracking step are from 0.2 hours to about 6 hours.

This step should be carried out under nonacidic conditions. This means that the mineral acid present in the first step product must be eliminated either by removal or by reaction with a neutralizing amount of an acid acceptor. Suitable acid acceptors include alkali metal and alkaline earth metal hydroxides, carbonates and bicarbonates. Satisfactory results can be obtained with any of these materials, so cost factors dictate a preference for sodium, potassium and calcium hydroxides, carbonates and bicarbonates. The carbonates are most preferred since they provide a buffering action at or about the desired neutral pH's.

The vinylacetamide which is formed in this reaction step is more volatile than the ethylidene-bis-acetamide feed material. It is desirable to remove it by volatilization from the reaction mixture as it is formed. This may be done by pulling a vacuum on the reaction vessel during reaction. Water fed and/or formed during neutralization and residual acetamides will also be volatilized. In a batch operation, most of the water and acetamide will be carried overhead first and can be isolated. In a continuous operation the three materials would come overhead at once such that further fractionation or crystallization or the like could be required to segregate the vinylacetamide. It is not essential that the vinylacetamide be completely purified. Vacuums of from about 1 mm Hg to about 50 mm Hg are suitable to effect volatilization of the vinylacetamide at the reaction temperatures. The acetamide-containing vinylacetamide product melts at about room temperature. Before it is polymerized, it optionally may undergo purification treatment to remove acetamide. This treatment may take the form of fractional crystallization, distillation, or passage through a bed of resin of a cation exchange type such as the styrene polymer based resins marketed by Rohm and Haas under the trademark, Amberlite ®.

The vinylacetamide monomer, with or without purification treatment, is polymerized. This polymerization is carried out in a liquid reaction medium using a free-radical initiator catalyst. There are two classes of suitable liquid media. Polar hydrogen bonding liquids, like water and lower alkanols, are suitable and function as solvents for the monomer and the polymer product. Non-polar liquids, such as hydrocarbons, ethers, and ketones, are also suitable, functioning as monomer solvents but not as solvents for the polymer, such that the polymer forms a second phase. Lower alkanols of from 1 to 5 carbons such as methanol, isopropanol, n-butanol and the like, are preferred media, with isopropanol being most preferred.

The amount of reaction media is generally selected to provide a concentration of vinylacetamide monomer of from about 10% to 50% by weight. Lower concentrations could be employed, but are not seen to offer any significant advantage.

A free-radical initiator is employed as catalyst. Suitable catalysts include the organic peroxides and other materials known in the art for this purpose. A commonly available and thus preferred catalyst is AIBN, 2,2;-azobis-(2-methylpropionitrile). The amount of catalyst is not critical. Generally, amounts of from 0.1 gram to 20 grams of catalyst per 100 grams of vinylacetamide is employed with additions of from 1 to 10 grams of catalyst per 100 grams of vinylacetamide being preferred.

The polymerization is carried out at a moderately elevated temperature such as from about 25° C. to about 125° C., with temperatures of from 50° C. to 110° C. being preferred. The polymerization requires from about 4 to 8 hours to complete, depending upon the exact temperature, catalyst, and monomer concentration employed. Generally, the reaction will be monitored by NMR or gas chromatography for unreacted monomer and continued until no significant monomer remains, for example, less than 5%, preferably less than 1%. Reaction medium is then removed and the polymer is recovered by precipitation in a non-solvent. Typical non-solvents include nonpolar organic liquids such as ketones, ethers and hydrocarbons. Suitable non-solvents include acetone, methylethylketone, methylisobutylketone, diethylether, diisopropylether, hexane, cyclohexane, n-pentane, benzene, and the like.

Following precipitation, the polymer product is recovered, washed, and optionally dried.

In the next step, the poly(vinylacetamide) product is hydrolyzed to poly(vinylamine) salt. This hydrolysis is suitably carried out in water in the presence of a strong acid. At least one equivalent of acid per equivalent of poly(vinylacetamide) should be used, such as from 1.05 to 3 equivalents of acid per equivalent of polymer. Too great an excess of acid can cause the hydrolysis product to precipitate prematurely. Suitable acids include, for example, hydrochloric, sulfuric, p-toluene sulfonic, trifluoroacetic and hydrobromic acids, with hydrochloric acid being preferred. This hydrolysis is carried out at elevated temperatures such as at the reflux temperature of the solution (110° C.) or temperatures in the range of from about 60° C. to 175° C. and, depending upon the temperature, requires from about 1 hour to about 36 hours, preferably 3 hours to 12 hours, to complete.

Following hydrolysis, the polymer salt can be recovered by further acidifying to cause it to precipitate. This may be carried out by adding additional acid to a concentration of 1 to 3 normal, cooling, and isolating the precipitating polymer. The precipitated polymer initially is a gum, but, upon drying forms a granular solid of poly(vinylamine) salt, such as the hydrochloride or the like. This product is a linear repeating polymer of the formula

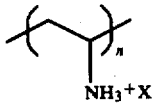

wherein n is 50 to 10,000 so as to provide a molecular weight of from about 4,000 to 800,000 and $X^-$ is the anion corresponding to the acid employed in the hydrolysis.

The process may be halted at this point, yielding as its product poly(vinylamine) salt. It also may be carried further, such as to form the free amine. This conversion may be effected by contacting the salt with an aqueous base such as an alkali metal or alkaline earth metal oxide or hydroxide, at a pH of 10 or greater. Typical useful bases include sodium hydroxide and potassium hydroxide. Other basic materials may be used as well, but are not as advantageous costwise. This neutralization may be carried out at temperatures in the range of 15°-50° C. such as at room temperature. This yields the polymeric free amine which may be isolated and dried, if desired. The polyvinyl amine product is a linear polymer. It is water soluble and has a formula

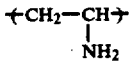

wherein n has a value of from 50 to 10,000 such that the polymer has a molecular weight of from about 2000 to about 450,000.

One excellent use of the polymeric amine is in the manufacture of polymeric azo and non azo colorants with the amine functionalities being useful for attaching the chromophoric groups to the polymer backbone.

In one preferred embodiment of this invention, the free amine is directly converted into a polymeric dye precursor by a "Schotten-Baumann" type reaction. In this reaction the polymeric amine is formed and contacted with an aromatic compound containing an amine precursor functionality and a sulfonyl chloride functionality

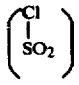

at relatively low temperatures (40° C. or less) and a pH of about 9-10. A typical reaction employs an aqueous reaction solvent, preferably also containing some water-miscible polar organic solvent such as tetrahydrofuran, dioxane, dimethoxyethane, diglyme, isopropanol or t-butanol and vigorous agitation.

Suitable aromatic compounds for use herein are n-acetylsulfanilyl chloride

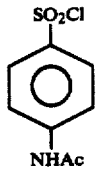

benzenesulfonyl chloride, tosyl chloride, p-bromobenzenesulfonyl chloride, p-nitrobenzenesulfonyl chloride, methanesulfonyl chloride and p-n acetylnaphthalene sulfonyl chloride

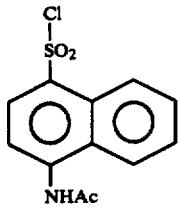

The concentration of polyamine in the solution should be maintained at from about 1% to about 20%, preferably at concentrations of about 5% to 15%, lower concentrations being uneconomic and higher concentrations leading to poor reactions. As a rule, the aromatic compound should be added gradually over a period of at least about 0.25 hours. During this addition, the pH should be monitored and maintained between about pH 9 and 10. After the addition is completed, the pH may suitably be raised somewhat, such as to 10-11, and the mixture stirred for an additional 0.5 to 4 hours. The reaction which occurs is as follows in the case where n-acetylsulfanilyl chloride is employed:

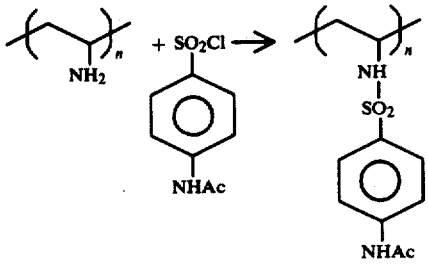

The product of this reaction may be isolated by stripping off the organic solvent and filtering. It is useful as a precursor in the formation of polymeric dyes. In this use, first it is contacted with acid (generally a substantial excess of aqueous mineral acid solution such as from 3-10 equivalents of acid per equivalent of acetyl groups) to deacetylate it. The deacetylation is not a rapid reaction, requiring about 6 hours at reflux temperature (100° C.). Higher or lower temperatures (200° C. or 50° C.) could be used if desired with accompanying changes in reaction time. This deacetylation produces the polymer

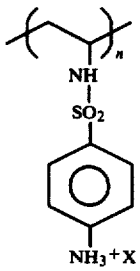

wherein $X^-$ is the cation corresponding to the mineral acid employed.

This product is next diazotized and coupled to form a dye. Diazotization is carried out on the polymer solution at low temperatures (0° C. to about 35° C.) in the presence of a molar excess of nitrate, such as sodium nitrite, potassium nitrite or the like. The diazotization is essentially instantaneous, requiring only a minute or two to complete so that reaction times of from about 0.1 minute to about 2 hours may be used. After diazotization is completed, the solution is added to a 0° C.–15° C. chilled solution of a chromophoric coupler at pH of about 13.0–13.5. This causes the desired azo dye to form. Suitable couplers include the wide range of coupling materials known in the art for forming azo dyes, including Schaeffer's salt, R-Salt

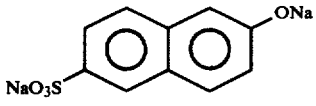

Pyrazalone T

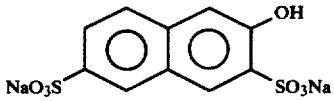

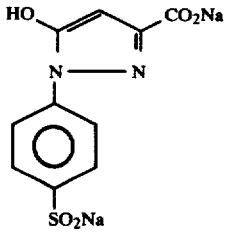

H-Acid

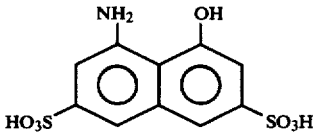

G-Salt

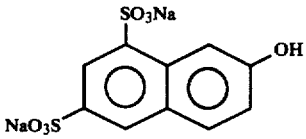

Chicago Acid

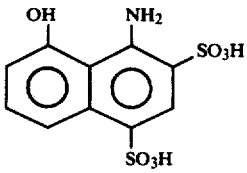

-continued

S-Acid

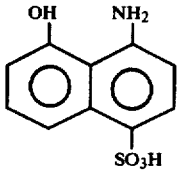

Chromatropic Acid

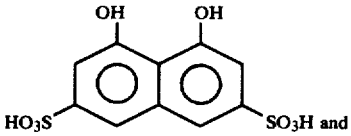

Novelle-Winter Acid

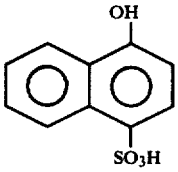

After coupling, the resulting solution is colored. It may be used as such as a dye or colorant or it may be further processed to isolate and/or purify the polymeric colorant component. These colorants find a wide range of applications coextensive with colorants of the prior art. They find a special application as well, as nonabsorbable food colorants, because their size permits them to be taken into the gastrointestinal tract and passed therethrough with a minimum of absorption into the systemic circulation. This assures that the products will have minimized toxicity risk compared to monomeric colorant compounds which can be absorbed through the gastrointestinal tract walls into the systemic circulation.

The invention will be further described with reference to the accompanying drawings.

Turning now to FIG. 1, a schematic flow diagram representing a semi-batch embodiment of the process of this invention is there depicted. Acetamide and acetaldehyde in a mole ratio of about 2–3 moles of acetamide per mole of acetaldehyde are charged to reactor 11 via conduits 12 and 14 respectively. Mineral acid (6 M sulfuric acid) is charged to reactor 11 through conduit 15 in an amount of 0.05 equivalents per mole of acetaldehyde. The mixture is heated to about 60° C. by means not shown while stirring with agitator 16 driven by electric motor 17. After about 15 minutes, there has been substantial reaction to form ethylidene-bis-acetamide, $CH_3—CH(NHCOCH_3)_2$. An acid acceptor or base, in this case calcium carbonate, is added to reactor 11 via conduit 19 in an amount sufficient to neutralize the mineral acid present. A high surface area, solid, inorganic oxide catalyst (Celite) is added to the mixture via conduit 20. Stirring is continued and the reaction temperature is raised to about 200° C., causing the ethylidene-bis-acetamide to crack, yielding vinylacetamide. A vacuum is drawn on reactor 11, causing the vinylacetamide and excess acetamide to volatilize and pass through conduit 21 to condenser 22, where they condense and pass as a liquid through conduit 24 to accumulator vessel 25. After the cracking is completed and the vinylacetamide has been collected, waste is withdrawn via conduit 26. Components of this waste stream, including the acid neutralization products, catalyst, and any further excess acetamide, may, if desired, be recovered. The vinylacetamide and acetamide collected in vessel 25 may undergo purification such as distillation, crystallization, or ion exchange resin treatment if desired, by means not shown. The vinylacetamide, with or without purification treatment, is passed via conduit 32 to polymerization reactor 34, which is equipped with motor 35 and agitator 36. A free radical-initiating polymerization catalyst is added through conduit 37 along with a lower alkanol reaction solvent such as methanol or isopropanol added through conduit 38, and the reaction mixture is stirred at 65° C. for 6 hours to polymerize this vinylacetamide into poly(vinylacetamide),

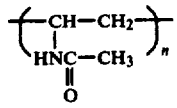

This polymer product solution is then passed through conduit 39 to precipitator 40, where it is continuously contacted with a flow of non-solvent (acetone) supplied through conduit 41, to form a suspension of solid polymer particles in the nonsolvent. Good contact between the nonsolvent and the polymer product is assured by disc agitator 42 driven by motor 44. This operation is carried out at about 20° C. The suspension is continuously passed through conduit 45 to solid/liquid separator 46. Separator 46 can take the form of a filter, a centrifuge, or equivalent means. Liquid, consisting primarily of non-solvent (acetone), dissolved residual acetamide, and lower alkanol reaction solvent is removed via conduit 47 to means not shown either to effect disposal or preferably recovery of its various components. Solid polymer product passes through conduit 49 to hydrolysis reactor 50. Aqueous hydrochloric acid in an amount of about two equivalents of concentrated acid for each equivalent of vinylacetamide polymer is added via conduit 51 and the mixture is agitated with agitator 52 (powered by motor 54) for about 6 hours while maintaining a reactor temperature of about 110° C. by means not shown. This converts the vinylacetamide polymer to vinylamine hydrochloride polymer. Additional hydrochloric acid (to 3 normal) is then added to the reactor 50 via conduit 51 to precipitate the polymer. At 110° C. the precipitated polymer is fluid and can be isolated as a separate liquid phase alternatively. The two phases are stirred while cooling to 30° C. (to solidify the polymer) and then continuously passed through conduit 56 to solid/liquid separator means 57, which may be a centrifuge, a rotary filter, a liquid stripper, or the like. In solid/liquid separator 57 a liquid phase comprising a hydrochloric acid solution is isolated and removed via conduit 59 optionally to recovery means not shown and solid polyvinylamine hydrochloride is removed via conduit 60. This solid polyvinylamine hydrochloride may be dried and shipped to users or it may be further treated by means not shown in FIG. 1 to yield further products.

FIG. 2 is a schematic flow diagram representing a section of an embodiment of the process of this invention which permits continous operation. In the embodiment of FIG. 2, the three steps which were carried out batchwise in reactor 11 in FIG. 1 are carried out in separate reaction zones. Reaction conditions and feeds are the same as set forth in the description of FIG. 1, unless otherwise noted. Acetamide, acetaldehyde, and sulfuric acid are continuously fed to reactor 11 through conduits 12, 14 and 15 respectively and stirred by motor 17 and agitator 16. The total liquid hourly space velocity (LHSV) of the reactants into reactor 11 is about three reactor volumes per hour. Reactor product, consisting primarily of ethylidene-bis-acetamide, $CH_3—CH(NHCOCH_3)_2$, is continuously withdrawn and passed via conduit 18 to neutralizer/mixer 11A where base ($CaCO_3$) and Celite surface catalyst are continuously added via conduits 19 and 20 respectively. These reactants are mixed by agitator 16A acting in concert with motor 17A to yield a neutralizer/mixer product which continuously withdrawn via conduit 18A and passed to reactor 11B. Reactor 11B, stirred by agitator 16B and 17B, is maintained at a temperature of about 200° C.-225° C. and an absolute pressure of about 40 mm Hg and is of a size to yield a LHSV of about one reactor volume per hour. These conditions effect cracking of the ethylidene-bis-acetamide and volatilization of a vinylacetamide product which is taken off as vapor through conduit 21, condensed in condenser 22, and continuously passed from the reaction zone via conduit 24. This flow of vinylacetamide then may be further treated in apparatus as shown in FIG. 1, with the modifications that accumulator 25 may be omitted if desired and that the passage of vinylacetamide to polymerization reactor 34 is continuous. Similarly, in a continuous mode of operation, the feeding of catalyst, the withdrawal of polymer product from reactor 34, its precipitation in precipitator 40, its isolation in separator 46, its hydrolysis in reactor 50, and its final recovery in separator 57 would all be carried out continuously.

Figure 3:
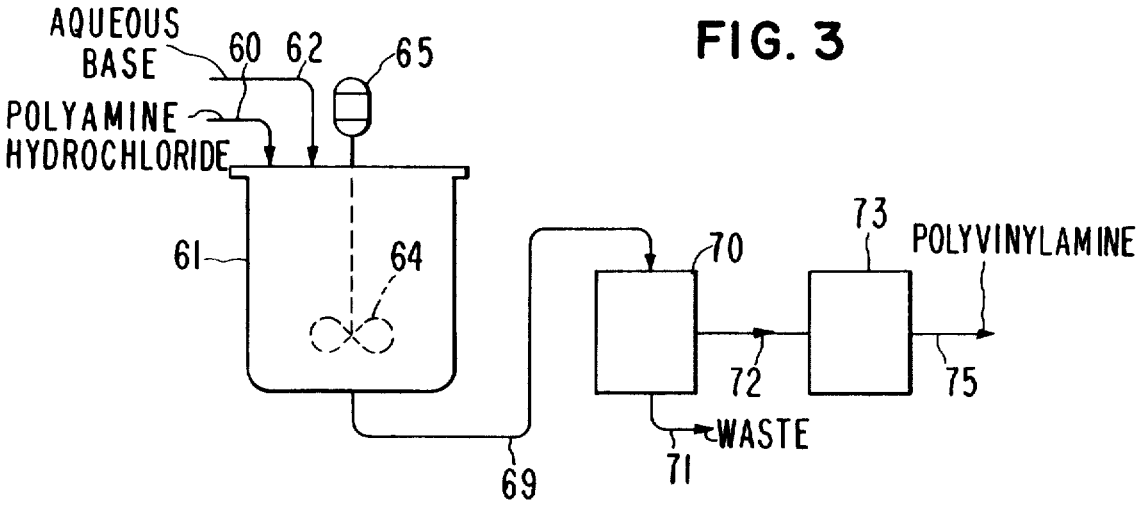
FIG. 3 illustrates a method for hydrolyzing the salt to the free amine.

As mentioned in the description of FIG. 1, it may be desired to prepare poly(vinylamine hydrochloride) as the ultimate product of this process. It may also be of interest to convert the hydrochloride to the free amine, poly(vinylamine). This may be carried out as shown in FIG. 3, which depicts in schematic flow diagram a process for effecting this conversion. In FIG. 3, the solid amine hydrochloride polymer, prepared such as in accordance with FIG. 1, is passed through conduit 60 into reactor 61, where it is stirred with aqueous base from conduit 62 (sodium hydroxide in an amount of about 5 parts by weight of 10% NaOH per part of polymer) for one hour at room temperature to yield the desired free polyamine. The product is then passed via conduit 69 to ultrafilter 70 where sodium chloride, excess base, and other impurities are removed and passed as a solution to waste or recovery via conduit 71. The poly(vinylamine) is removed through conduit 72 to dryer 73 where the poly(vinylamine) is isolated. Solid amine is removed via conduit 75 to further processing, packaging or use as desired.

As will be appreciated by those skilled in the art, a continuous mode of operation could be easily effected in the processes of FIG. 3 by continuous feeding and removal of reactants and reaction products.

In a preferred application of this invention, poly(vinylamine hydrochloride) is converted to the free amine, which is in turn used as a precursor in the production of polymeric dyes and colorings. FIG. 4 depicts a schematic flow diagram of one semi-batch embodiment of this preferred application. Poly(vinylamine) hydrochloride), prepared such as is shown in FIG. 1, passes through conduit 60 to reactor 61. Aqueous base (NaOH) is added via conduit 62. Solvent (THF) is added via conduit 71. N-acetylsulfanilyl chloride is added via conduit 78. The relative amounts of these materials are:

| | |
|---|---|
| poly(vinylamine hydrochloride) | 1.0 equivalents |
| aqueous base | 2.0 equivalents |
| N-acetylsulfanilyl chloride | 0.1-3.5 equivalents |
| solvent | sufficient to yield a 1-50% by weight emulsion |

The mixture is maintained at a temperature of about 0°-30° C. and is stirred by agitator 64 and motor 65 for about 2 hours. The pH is maintained at pH 9-10 by base addition. This causes the free amine to form and serially react with the NH acetylsulfanilyl chloride in a Schotten-Baumann type reaction to yield the polysulfonamide compound

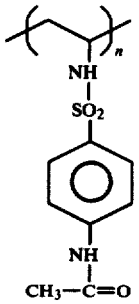

The reaction mixture is passed through conduit 66 to solvent stripping column 72 where THF is taken overhead and removed via conduit 74, preferably for recycle to conduit 71. The removal of solvent causes the polysulfonamide to precipitate and form a slurry. This slurry is passed through conduit 75 to separator 67 where an aqueous liquid phase containing residual solvent, polymer, and sulfonic acid salt and neutralization products is removed via conduit 69 optionally to component recovery apparatus not shown. Solid polysulfonamide is isolated in separator 67 and passed via conduit 70 to deacetylation reactor 79 where it is stirred by agitator 80 and motor 81 at 100° C. for 2-14 hours with 3-20 equivalents of dilute aqueous hydrochloric acid supplied through conduit 82. The reaction product, a solution of the deacetylated polymer

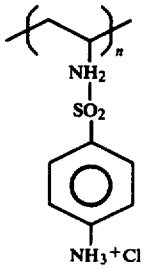

then is passed via conduit 84 to diazotization reactor 85 where sodium nitrite (1.0 moles per equivalent of polymer) is added via conduit 89 and stirred by agitator 86 and motor 87 for ½ hour at 15° C. to form a solution of the diazotized polymer.

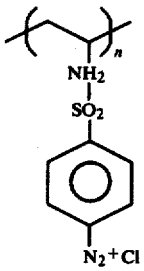

This solution is passed through conduit 90 to dye coupling reactor 91 and is stirred by agitator 92 and motor 94 with a dye coupler, such as Schaeffer's salt, previously added via conduit 95. About 1.1 moles of coupler per equivalent of polymer is employed. After about one-half hour of stirring at about 10° C., a polymeric dye is formed having a structure

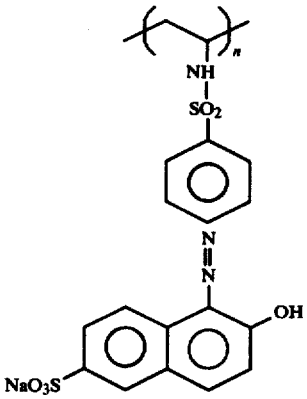

This material is water soluble, so that the reaction product is a solution. The solution could be used as a colorant without further treatment. More commonly, however, it is purified to remove deacetylation products, excess sodium nitrite, unreacted dye coupler and the like. In one embodiment, this purification is effected by passing the solution via conduit 96 to dialysis unit 97 where these impurities are dialyzed into water supplied through conduit 99 and removed via line 100 either to waste or preferably to recovery means not shown. The purified solution of dye may then be passed, if desired, via conduit 101 to concentration means 102, where water is removed via conduit 104 and a concentrated solution of dye or (if concentration means 102 takes the form of a dryer) solid dye is recovered and removed via conduit 105. As with the other batch processes here-illustrated, it can be readily seen to modify this semi-batch reaction scheme to yield a continuous process if desired.

The invention is further described by the following Examples. These are merely to illustrate the invention and are not to be construed as limiting its scope, which is instead set forth by the appended claims.

EXAMPLE I

A. Preparation of Vinylacetamide

To 462 g of acetamide (technical) was added 12.45 ml of 6 M aqueous sulfuric acid followed immediately by 168 ml (3 moles) of acetaldehyde (90+%). This mixture was stirred and heated until the internal temperature reached 70° C. (9 minutes). After another minute of heating, the 95° C. clear solution spontaneously crystallized, causing a temperature rise to 106° C. The reaction product, ethylidene-bis-acetamide, was not separated. Heating and stirring were continued for another 5 minutes and a mixture of 60 g calcium carbonate (precipitated chalk) and 30 g soft glass powder was added. The resulting mixture was heated to cracking temperature and distilled at 40 mm Hg (200° C. bath temperature). When the internal temperature reached 160° C. (0.5 hr.), the receiver was changed. After another 1.7 hr, the distillation was almost over, the stirrer was stopped and the heating continued. Slow distillation continued for another hour and was then stopped. The first distillation fraction was 95.9 g of water and acetamide. The second fraction was 466 g of orange oil and crystals. NMR indicated this mixture to contain 195 g vinylacetamide (76% yield), 217 g acetamide, and 54 g ethylidene-bis-acetamide.

B. Polymerization of Vinylacetamide

A red-brown solution of 460 g of vinylacetamide, 557 g acetamide, and 123 g ethylidene-bis-acetamide, (one-half of five combined vinylacetamide preparations in accord with part A) in 570 ml methanol was filtered through 250 g of Amerilite® IRC-50 ion exchange resin over an eight hour period. The column was rinsed with 1,000 ml methanol. The combined column eluant was stripped to its original volume of 1,667 ml, treated with 7.75 g of AIBN polymerization catalyst (1 mole %), deoxygenated, and stirred under argon at 65° C. for 15 hours to polymerize. Solid polymer was precipitated from the resulting very thick solution by addition to 15 liters acetone. The polymer was collected by filtration, washed with acetone and dried in a vacuum oven (80° C.) for 2 days to afford 459 g of crude poly(vinylacetamide) contaminated with acetamide as a yellow, semi-granular solid having molecular weight of 200,000 as determined by Gel Permeation Chromatography, using demethylformamide as eluent and polystyrene as standards.

C. Hydrolysis of Poly(vinylacetamide) to Poly(-vinylamine hydrochloride)

The crude poly(vinylacetamide) obtained in part B (459 g) was dissolved in 1,000 ml water with heating. Concentrated hydrochloric acid (1,000 ml) was added and the resulting dark brown solution was stirred and heated at a gentle reflux (97°-106° C.) for 19 hours. A precipitate formed and was redissolved by addition of 200 ml water. Reflux was continued and over the next 8 hours 1,000 ml water was added in several portions to maintain solubility of the polymer. After a total of 27 hours at reflux, the polymer was precipitated by the addition of 1,000 ml concentrated hydrochloric acid. The mixture was cooled to 18° C. and the thick polymeric gum isolated by decantation and dried under vacuum at 50°-75° C. with occasional pulverization for 40 hours to give 332 g of poly(vinylamine hydrochloride) as a brown granular solid (77% yield from vinylacetamide, 59% from acetaldehyde).

D. Conversion of Poly(vinylamine hydrochloride) to Sulfonamido Adduct 70.0 G of the poly(vinylamine hydrochloride) of part C was added with 0.7 liters of water to a 5 liter stirred flask. Water was added to a volume of 7.0 liters. The pH was raised from 2.5 to 10.0 by addition of 2.5 M NaOH. Then 350 ml of tetrahydrofuran was added to yield a solution of the free amine.

Next, 308 grams (1.5 equivalents) of N-acetylsulfanilyl chloride was added slowly, pH being controlled at 9.0-9.5 by NaOH addition. 700 Ml of THF was added to maintain a solution. Additional NaOH was added to carry the pH to 10.5-11.0. THF was stripped off under vacuum. A precipitate formed and was collected and found to be the polymer

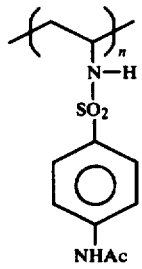

This reaction was repeated three times, yielding a total of about 840 g of product.

E. Hydrolysis

The individual products of the four runs of part D were hydrolyzed.

To a flask was added one of the reaction products, 1.7 liters of water, and 440 ml of conc. hydrochloric acid. The mixture was refluxed for 6 hours to yield a solution of the amine

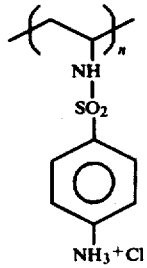

As a precaution, the reflux was continued overnight. (This reaction was repeated with each product of part D.)

F. Diazotization and Coupling

One of the solutions of part E containing 1.0 equivalents of polymer and 6.0 equivalents of hydrochloric acid was cooled to 15° C. 211 Ml of 5 N $NaNO_2$ was added with stirring. The mixture was stirred for 30 minutes. The solution was then transferred to a solution of 249 g (1.15 equivalents) of Schaeffer's salt in 6 liters of water and 8 equivalents of NaOH at a temperature of about 10° C. (maintained by ice addition). This solution was stirred for 30 minutes. NaOH was added to pH 12 and a solution of the polymeric Sunset Yellow colored dye,

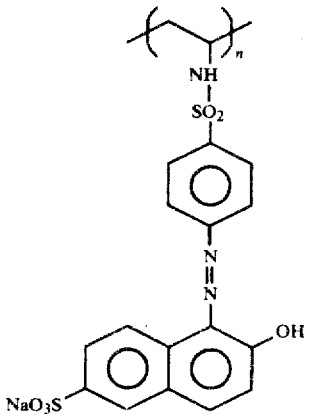

was obtained.

Water and low M.W. impurities were then removed to yield the dye as a dry powder.

EXAMPLES II-V

A second product of part E of Example I was diazotized with $NaNO_2$ as set forth in part F of Example I. The resulting solution was divided into several portions and treated with a variety of coupling agents.

In Example II, a solution containing 0.29 equivalents of diazo groups was treated with 143 g of pyrazolone T and after treatment under the conditions of part F of Exaple I yielded 109 g of a polymeric tartrazine colored dye.

In Example III, R salt was the coupling agent such that the final dye had a formula

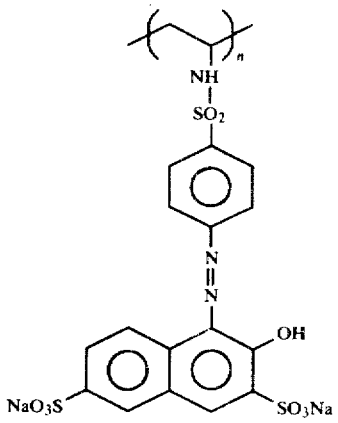

In Example IV, Chicago acid was the coupling agent such that the final dye was

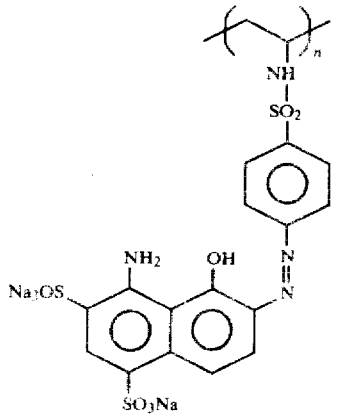

In Example V chromatropic acid was the coupling agent such that the final product was

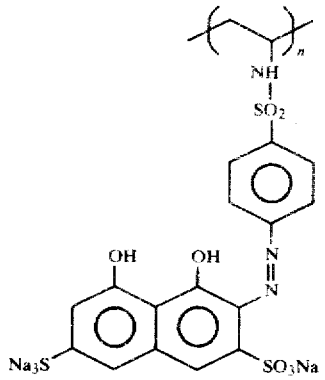

We claim:

1. A process for preparing poly(vinylamine) salt which comprises the steps of:

A. reacting at a temperature of from 20° C. to 100° C. acetaldehyde with from two to four stoichiometric equivalents of acetamide in the presence of from 0.001 to 1.0 mole per mole of acetamide of an aqueous mineral acid catalyst to yield a vinylacetamide and ethylidene-bis-acetamide containing reaction product, B. neutralizing the aqueous mineral acid catalyst and heating the vinylacetamide and ethylidene-bis-acetamide containing reaction product to 150° C. to 250° C. for from 0.2 to 5 hours in the presence of an inorganic nonacidic silicious oxide surface catalyst to yield a decomposition product, said catalyst having a surface area of at least about 1 $m^2/g$, C. separating vinylacetamide from said decomposition product by vacuum volatilization, D. contacting with vinylacetamide at a concentration of from 10% to 50% by weight in a reaction medium selected from polar hydrogen bonding liquids and nonpolar liquids with from 0.1 to 20 grams per 100 grams of vinylacetamide of a free radical initiator polymerization catalyst at a temperature of from 25° C. to 125° C. for from 4 to 8 hours to yield poly(vinylacetamide), E. hydrolyzing said poly(vinylacetamide) by contacting it with from 1.05 to 3 equivalents of a mineral acid per equivalent of poly(vinylacetamide) at a temperature of from [25° C. to 125° C. for from 4 to 8 hours] *60° C. to 175° C. for from 1 to 36 hours* to yield the poly(vinylamine) salt of said mineral acid, and F. precipitating and recovering said poly(vinylamine) salt.

2. The process of claim 1, wherein in step B said catalyst is celite and a reaction temperature of from 70° C. to 200° C. is employed.

3. The process of claim 1, wherein in step B said catalyst is high surface area glass and a reaction temperature of 70° C. to 200° C. is employed.

4. The process of claim 3, wherein in step E, said mineral acid is hydrochloric acid.

5. A process for preparing poly(vinylamine) which comprises contacting said poly(vinylamine) salt of claim 1, step F, with not less than a stoichiometric amount of an aqueous solution of a strong base selected from the alkali and alkaline earth metal hydroxides, thereby converting said poly(vinylamine) salt to said poly(vinylamine).

6. The process of claim 5, wherein said strong base is an alkali metal hydroxide.

* * * * *